United States Defensive Publication [19] (H) [11] T983,003

Leonard et al. [43] Jun. 5, 1979

[54] COATING COMPOSITIONS

[76] Inventors: Don R. Leonard, Rte. 15, Old Castle Rd.; Charles H. Coney, 2008 Canterbury Rd., both of Kingsport, Tenn. 37660

[21] Appl. No.: 942,110

[22] Filed: Sep. 14, 1978

[51] Int. Cl.[2] ..... B32B 33/00; C08L 1/12

[52] U.S. Cl. ..... 428/335; 106/186; 106/191; 428/484

[57] ABSTRACT

Coating compositions are disclosed which provide improved resistance to the transmission of vapor through various substrates, especially paper, paperboard and regenerated cellulose. The compositions comprise one or more cellulose esters, and a small amount of a blend of paraffin and an amide of a long chain saturated or unsaturated fatty acid. The composition is in a conventional solvent and preferably includes conventional plasticizers. Conventional additives such as pigments, stabilizers, etc., may be used.

1 Claim, No Sheets Drawing,

16 Pages Specification

The file of this unexamined application may be inspected and copies thereof may be purchased (849 O.G. 1221, Apr. 9, 1968).